March 29, 1960 W. H. BUCHSBAUM 2,930,975

NETWORK RESPONSE TESTING APPARATUS

Filed June 11, 1953 2 Sheets-Sheet 1

INVENTOR.
WALTER H. BUCHSBAUM

BY Ostrolenk & Faber

ATTORNEYS

March 29, 1960 W. H. BUCHSBAUM 2,930,975

NETWORK RESPONSE TESTING APPARATUS

Filed June 11, 1953 2 Sheets-Sheet 2

INVENTOR.
WALTER H. BUCHSBAUM
BY
Ostrolenk & Faber
ATTORNEYS

United States Patent Office 2,930,975

Patented Mar. 29, 1960

2,930,975

NETWORK RESPONSE TESTING APPARATUS

Walter H. Buchsbaum, Bellerose, N.Y., assignor to Standard Coil Products Co., Inc., Los Angeles, Calif., a corporation of Illinois Application June 11, 1953, Serial No. 360,987

1 Claim. (Cl. 324—57)

The present invention relates in general to electronic test systems and more particularly concerns apparatus for generating signals for facilitating precise presentation of the frequency response characteristics of a network upon a cathode ray oscilloscope.

In numerous experimental and production line procedures, it has been advantageous to present graphically the relationship between relative output amplitude, for a fixed input amplitude, as a function of input frequency over a predetermined band. A representative example of this is encountered in the production line adjustment of multi-channel television tuners. A common procedure is to use a sweep oscillator whose mean frequency is adjusted to substantially the mid-point of the channel being tuned and whose frequency deviation in either direction is at least equal to one-half the channel band width. Using a cathode ray oscilloscope, and applying the detected output of the tuner channel under test to the vertical deflection system and a sweep frequency to the horizontal deflection system, a characteristic band-pass curve is displayed upon the screen. By proper interpretation, and if need be, by comparison with prior standardized curves, the tuner parameters such as amplitude response at different frequencies on the band may be adjusted so that the channel undergoing adjustment has precisely the required characteristics. With the exception of variation of mean frequency, the adjustments required for each channel are, in principle, essentially the same.

Accurate interpretation of the oscilloscope presentation is only possible when the frequencies used are precisely known and where the oscilloscope sweeps are accurately related to the instantaneous frequency deviation of the oscillator signals. Insofar as the relative response is concerned, as represented on the oscilloscope by vertical deflection, no unusual problems are presented because substantially all cathode ray oscilloscopes are constructed with linear vertical deflection amplifiers. Once the vertical gain of an oscilloscope has been established, and its attenuator control calibrated, further adjustment is no longer necessary. However, in the type of display hereinabove noted, horizontal deflections represent frequency deviation; and accordingly, must be carefully related back to oscillator frequency.

Numerous procedures are known, and test equipment is available, for superimposing upon the trace of an oscilloscope frequency marker pips which coincide with the frequency represented by that point of the trace. That is to say, the network response curve representing relative output amplitude contains a plurality of intensified points (or minor trace deflections) which represent particular frequencies.

In visually presenting a network frequency response characteristic, it is highly desirable that frequency be linearly plotted horizontally so that marker pips representing equal frequency increments will be uniformly spaced on this axis. It is to be observed, however, that if a linear relationship is desired between frequency and horizontal oscilloscope deflection, means must be provided for linearly and synchronously relating oscilloscope sweep potential with oscillator frequency sweep. Further, with reference to the television tuner problem, this linear relationship must be maintained not only throughout the particular frequency deviation representing a single television channel, but also for fixed frequency deviation about the mean frequencies of a multiplicity of channels. Considering the UHF bands presently allotted to commercial television broadcast, it becomes necessary to provide this linear relationship from a low frequency of the order of 50 megacycles to a high frequency of the order of one thousand megacycles.

It is at least theoretically possible to use a frequency discriminator circuit for generating a potential linearly related to the instantaneous frequency of the sweep oscillator used for testing. But whatever advantages may be derived therefrom will immediately be offset by the complex problem presented in obtaining a discriminator usable over the exceedingly broad range of frequencies specified above. The primary limitation, of course, is cost, but neglecting this for a moment, the need for critical adjustment renders the design impractical for commercial production line use.

The present invention has as a primary object the provision of network frequency response test apparatus which reliably yields signals for application to a network under test and to a cathode ray oscilloscope for the visual presentation of frequency response characteristics over an extended band of operation. As will be pointed out shortly, an uncommon degree of linearity is achieved between frequency deviation and oscilloscope horizontal deflection, all with a minimum of commercially available, dependable electronic equipment.

In one aspect of the present invention, a tunable, ultra-high frequency oscillator is provided with an oscillatory tank circuit partly formed of a transmission line; and electromechanical means are incorporated for oscillating a flat conductor at a comparatively low frequency in proximate relation with this transmission line. In this manner, the tank circuit parameters are continuously varied for establishing a frequency deviation of adjustable magnitude. As a further novel aspect of this invention, the mechanical oscillation noted is achieved by a transducer, such as a loud speaker drive mechanism.

In this connection, certain phenomena should be considered. Bringing a non-magnetic conductive elment into the field of oscillating circuit effectively reduces its inductance, and thereby raises oscillator frequency. A practical limitation to the use of such an arrangement, however, has been the fact that as the conductor is brought closer to the tank circuit, the change in inductance becomes more pronounced. By virtue of this fact, and further, because frequency and inductance are non-linearly related, the output frequency deviation does not bear a linear relation to the conductive plate driving signal. It is possible to introduce certain compensations to the signal driving the conductive member in the region of the tank circuit in order to achieve a linear relationship between driving signal and frequency deviation. However, in view of the fact that a modest amount of power is necessary to drive an electromechanical unit, compensation of its signals would prove to be costly and would substantially sacrifice portability.

It is an object of the present invention to utilize a conveniently available driving signal, as for example, a sine wave potential for an electromechanical transducer to sweep an oscillator frequency; and to derive a compensated potential, as described below, for direct application to the low power input of the horizontal deflection system of a cathode ray oscilloscope. In this manner, although the frequency deviation of the oscillator is non-linear as a function of time, frequency deviation is presented as a linear function of horizontal deflection on the cathode ray oscilloscope.

Another object of the present invention is to provide means for compensating a sine wave signal for linearly presenting a frequency sweep upon a cathode ray oscilloscope.

Still another object of the present invention is to provide means for deriving a swept high frequency signal, adjustable well into the UHF band.

A further object of this invention is to utilize the output of a sweep oscillator together with a compensated sine wave for visually presenting a plot of the frequency transfer characteristics of a network under test.

These and other objects of the present invention will become apparent from the following detailed specification when taken in connection with the accompanying drawings in which.

Figure 1:
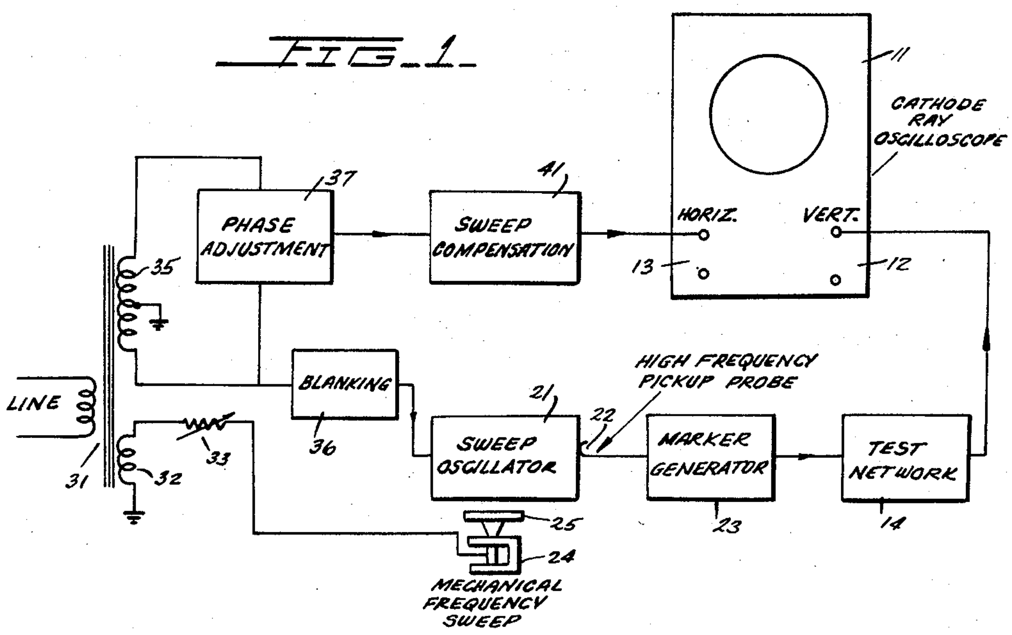
Figure 1 is a block diagram showing the logical interconnection of key elements used in this invention.

With reference now to the drawings, and more particularly to Figure 1 thereof, there is illustrated apparatus for visually presenting the characteristics of a network under test upon a cathode ray oscilloscope of conventional design.

In the drawing, the details of the cathode ray oscilloscope 11 have been almost entirely omitted since a large number of commercially available oscilloscopes will perform the functions herein described. Represented on the drawing, however, are terminals 12 and 13 which respectively represent the vertical and horizontal (Y and X axis) inputs to the oscilloscope. Terminals 12 are coupled internally to a conventional vertical amplifier (not shown) whose output is ultimately connected to the vertical deflection plates of the cathode ray tube. Although an oscilloscope is customarily equipped with internal saw-tooth sweep deflection sources, such signal is not used and the signals applied to terminals 13 are either coupled directly to the horizontal deflection plates to provide the system sweep or are coupled through a linear horizontal amplifier (not shown), much like the vertical amplifier, and then to the horizontal deflection plates.

The output of test network 14 (which may be a television tuner network) is coupled to the vertical deflection system of the oscilloscope. It should be understood, however, that since the signals appearing at the output of the network under test may in themselves be at ultra-high frequency, a small detector, such as a crystal rectifier or the like, may be provided so that the signal input to the vertical deflection system of the oscilloscope is the envelope of the high frequency output of the test network.

With the connections of the cathode ray oscilloscope and test network in view, the sweep frequency circuits may now be described. In particular, a sweep oscillator 21, which may be adjusted in range from the lowest frequency desired for the test network to the highest (as, for example, 50 to 1000 megacycles) has its output coupled by a high frequency pick-up probe 22 to the input of marker generator 23. Marker generator 23 may, for example, be a single tuned circuit. The output from marker generator 23 is applied to the input of the test network 14 so that the energy from sweep oscillator 21 passes through the marker generator 23 and is applied to test network 14.

In particular, when the present testing apparatus is to be used for testing a number of channels in television tuners, marker generator 23 is utilized to produce first a pip at the low frequency end of the desired pass band, for example, at the low 3 db point, to permit an operator to trim the tuner until the pass band curve of the tuner for that particular channel has its 3 db point in the position indicated by the pip. This operation must, of course, be repeated for the high 3-db point. This procedure may be repeated for each channel of the tuner to be tested, or for a specific number of them in a desired band, for example, for the band of channels between channels 20 and 29.

The adjustment for the mean frequency of sweep oscillator 21 is not shown in Figure 1, but will be described below. However, there is shown an electromechanical device 24 driving a non-magnetic, conductive plate 25 in proximity with the sweep oscillator 21 for sweeping the mean frequency over a relatively narrow band at a rate which is determined by the frequency of the signal energizing electromechanical device 24. As shown in Figure 1, a transformer 31 energized from the power line (ordinarily at 60 cycles) drives the frequency sweep device 24 through a low voltage secondary 32 at an amplitude as determined by the setting of adjustable resistor 33. In other words, resistor 33 determines the amplitude of oscillation of conductive plate 25 and this, in turn, determines the positive and negative deviation of oscillator frequency from its mean value.

A grounded center tap secondary 35 on transformer 31 is used to provide two signals as follows. From the lower end of this secondary, a signal at line frequency is applied to a blanking circuit 36 whose output is in turn applied to a control element of the sweep oscillator 21. Thus, during period of actuation of the blanking circuit, sweep oscillator 21 is wholly cut-off and no signal is obtained at pick-up probe 22. The outer ends of secondary 35 are connected to a phase adjusting network 37 and a signal derived therefrom, which is used as the horizontal sweep for cathode ray oscilloscope 11. However, in accordance with the principles of this invention, this sweep potential is not applied directly to the oscilloscope, but rather through a sweep compensation or linearity network 41 functioning in a manner to be discussed.

Having thus presented the general interconnection of key elements, the functions of the apparatus may now be discussed. Electromechanical device 24 sweeps the frequency of oscillator 21 through an adjustable frequency band at a predetermined mean frequency. The output of the oscillator, together with marker signals, is applied to the network under test, and the network output applied to the oscilloscope vertical axis. Simultaneously, the oscilloscope beam is swept horizontally at a rate equal to that of the sweep frequency oscillator and at a phase suitable for presenting the frequency characteristic. The horizontal sweep signal is so adjusted that the deflection of the cathode ray oscilloscope is a substantially linear function of the frequency then being generated by the sweep oscillator. A blanking signal is provided whereby the oscillator is swept only during excursions of conductive plate 25 in one direction. During the return sweep thereof, the oscillator is cut off to preclude ambiguous display.

Figure 2:
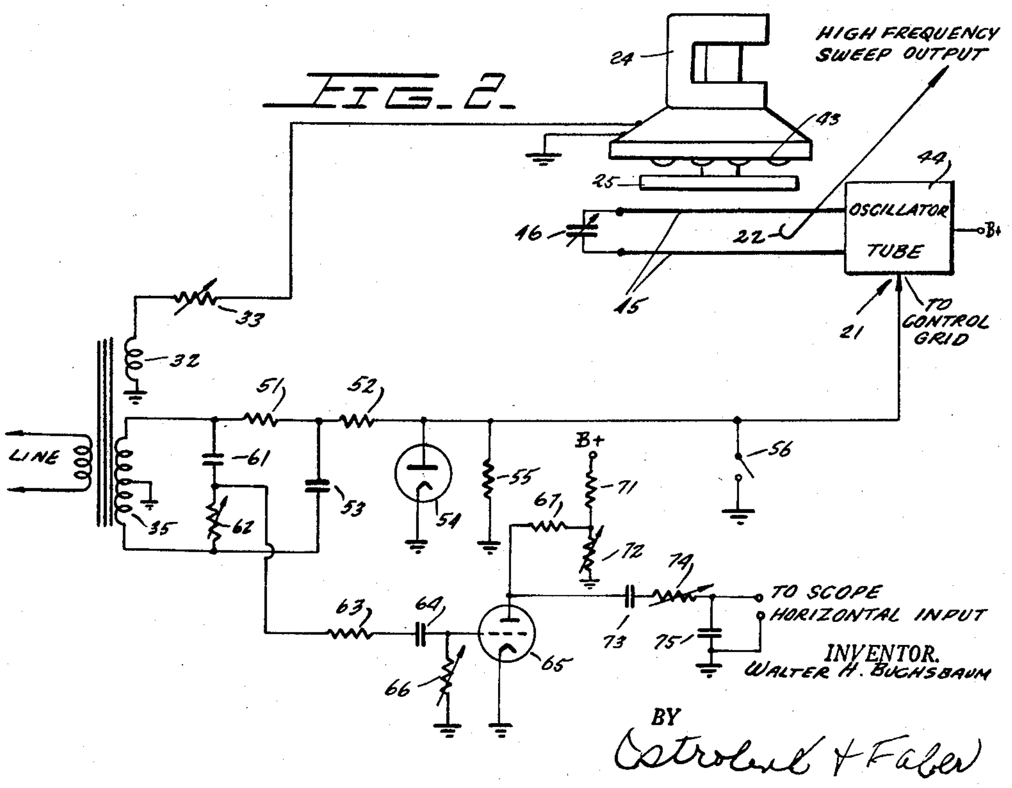
Figure 2 is a schematic circuit diagram of the novel sweep oscillator and linearity compensation system.

For a discussion of the linearity feature of the circuits herein disclosed, reference is now made to Figure 2. Since certain of the elements of Figure 1 have been carried forward to this figure, like reference numerals have been used as applicable.

Specifically, a power transformer 31, operating from the line, energizes two secondaries 32 and 35. The output of secondary 32 is applied through adjustable resistor 33 to the electromechanical device 24. Although numerous electromechanical devices may be used for the functions herein required, it has been found preferable to use the driving element of a loud speaker. Thus element 24 is comprised essentially of a magnetic yoke and a diaphragm 43 to which conductive plate 25 is attached. It is apparent that if the power from the line is a 60 cycle source, conductive plate 25 will oscillate at 60 cycles per second at an amplitude determined by the setting of resistor 33. The sweep frequency oscillator 21 of Figure 1 has been shown in Figure 2 as comprised of several elements including an oscillator tube 44 energized from a suitable power source B+, and capable of sustained operation over the broad frequency range contemplated. Since numerous tubes are available which may perform this function and since oscillator circuits are well-known, a detailed schematic has not been shown.

The oscillator tank circuit coupled to tube 44 is comprised essentially of a transmission line 45 which may be in the form of a pair of parallel wires, rods, or strips terminated by adjustable capacitor 46. It is the inductance and capacitance of the transmission line 45 and capacitor 46 which determine the mean operating frequency of oscillator tube 44. The output signal of this oscillator is taken by pick-up probe 22 coupled with the oscillatory field in the region of transmission line 45.

Circuit means are provided in the apparatus shown in Figure 2 for blanking the oscillator tube during alternate half cycles of the signal applied to electromechanical device 24. This blanking signal is generated by coupling an output of secondary winding 35 through a phasing network comprised of resistors 51 and 52 and capacitor 53 to a diode rectifier tube 54 poled as shown in the drawing. In operation, diode 54 will essentially short-circuit to ground positive half cycles of the sine wave output of secondary 35. Negative half cycles will appear across resistor 55 and are directly coupled to the control grid (not shown) of oscillator tube 44. Thus, throughout these negative half cycles, oscillator tube 44 is wholly cut off so that no signal appears on pick-up probe 22 for application to the network under test. A switch is provided for removing the blanking and to permit phase adjustments.

The frequency deviation of oscillator tube 44 during periods of conduction is determined by the relative position of plate 25. As noted earlier, as plate 25 comes closer to transmission line 45, the frequency at the output increases. Noting that the drive to the plate 25 is sinusoidal, and assuming that the plate displacement follows the applied signal linearly, the output frequency is not linear as a function of time. This is due to the phenomenon, above mentioned, that the relative frequency change is considerably greater for a given displacement when the plate 25 is closer to the transmission line 45. Rather than attempt the complex and expensive procedure of compensating the drive to electromechanical device 24 so that a linear frequency sweep is obtained, the sinusoidal drive is used and a non-linear sweep generated.

System linearity is accomplished by providing an output signal for application to the horizontal deflection of the oscilloscope, which signal sweeps the beam at a rate directly proportional to the frequency deviation.

The novel manner in which this is accomplished is shown in Figure 2. Since the horizontal sweep signal must be at the same frequency as the drive applied to electromechanical device 24, the sweep signal is taken from secondary 35 through an adjustable phase compensation network formed of capacitor 61 and adjustable resistor 62 in series. The phase shifted sine wave is applied through resistor 63 and capacitor 64 to the control grid of an electron tube triode 65, which grid is shunted to ground through adjustable resistor 66. The cathode of triode 65 is grounded, and the plate thereof is returned through load resistor 67 to a positive point at the junction between fixed resistor 71 and adjustable resistor 72 connected between B+ and ground.

The output of tube 65 is taken from its plate through capacitor 73, and applied to a sweep network comprised of adjustable resistor 74 and capacitor 75 connected in series. The sweep output is applied to the horizontal input of the oscilloscope. The relationship of the horizontal sweep to the remainder of the system is shown best in Figure 1.

Analyzing the operation of the circuit of Figure 2, it may be seen that by adjustment of resistor 66, a grid clipping level may be established for triode 65. By adjustment of resistor 72, a plate saturation potential level may be established. As a result, both positive and negative clipping levels may be independently adjusted, and if desired, once the levels are selected, fixed resistors may be substituted for the adjustable units. The clipped output is applied to the sweep circuit 74–75 to provide, after adjustment of the variable resistors, the compensated sweep output. Adjustment is made primarily for linear frequency display rather than for a particular wave shape.

Evidently, phase adjustment must be carefully observed since it is desired to provide an output signal from the sweep oscillator during travel of plate 25 in one direction only. Thus, the phase of the blanking circuit is established to cut off oscillator tube 44 throughout displacement of plate 25 in the reverse direction.

Figures 3A, 3B, 3C:
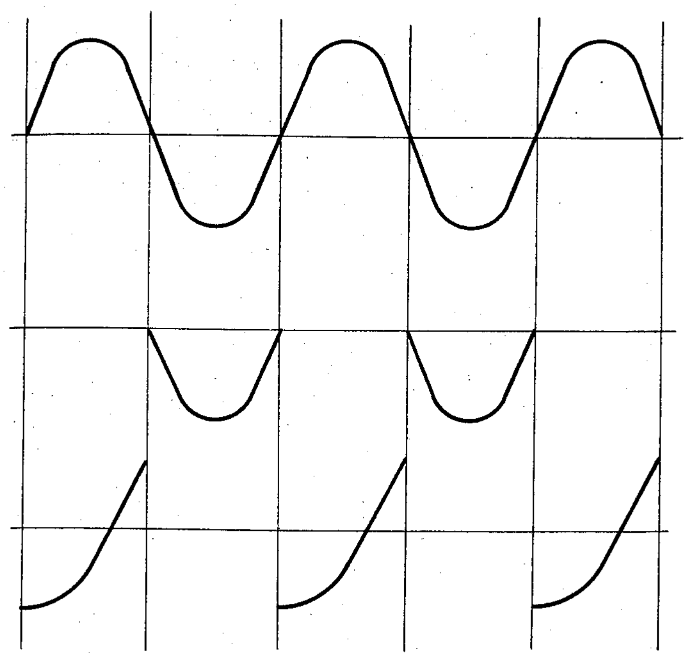
Figure 3 is a graphical representation of wave-forms of signals appearing in the circuits of this invention.

Adjustment of resistor 62 permits selection of the phase of the signal applied to triode 65 so that the sweep output varies only in one direction during the interval that plate 25 completes its excursion from one extreme point of travel to the other. This phase relationship is best illustrated in Figure 3. In this drawing, curve A represents the input sine wave, curve B represents the blanking signal applied to the oscillator tube during half cycles of the input, and curve C designates the sweep output appearing at the input of the horizontal deflection system of the ocilloscope.

It should be noted that the input to the blanking circuit is obtained from a point different from the one from which the input to the sweep circuit is obtained so that the voltages applied to the blanking circuit and to the sweep circuit are 90° out of phase.

Although the signal applied to the transducer 24 is sinusoidal in form, the sweep signal output is non-sinusoidal. Initially, this wave form is rather flat and then rises at a sharp rate as the frequency of the oscillator increases more rapidly with plate motion.

Figure 4:
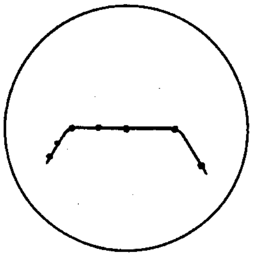
Figure 4 is a diagrammatic representation of an oscillogram representing particular operating conditions facilitating discussion of this invention.
Figure 5:
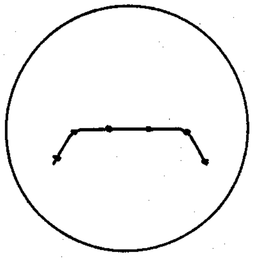
Figure 5 is a diagrammatic representation of an oscillogram showing conditions as they exist in operation of the present invention.

The effects of these circuits are clearly illustrated in the comparative oscillograms of Figures 4 and 5. Figure 4 illustrates the frequency response characteristics of a network under test for a predetermined frequency deviation, where a simple sinusoidal sweep is used for horizontal deflection. The frequency marker pips indicated on this curve graphically represent equal frequency displacements.

It will be observed then, that due to non-linearity, the marker pips are "bunched" at one end of the curve and expended at the other. In Figure 5, the oscillogram represents identical test conditions with the exception that the sweep used is that shown in Figure 3C. It will be immediately observed that the frequency marker pips are now uniformly spaced, indicating a degree of circuit linearity heretofore unattainable.

It may be desired to "stretch" or compress the frequency linearity at either end of the presentation. With this system this is possible for any combination of "stretching" or compressing.

Of particular importance is the fact that the oscillogram of Figure 5 may be achieved with substantially any setting of capacitor 46, shown in Figure 2, without adjustment, after the initial set-up of the blanking circuit associated with diode 54 and triode 65. In other words, once this system has been placed in operation, the operator thereof need only select the frequency band in which he desires to operate by adjustment of capacitor 46, establish the frequency deviation by adjustment of the resistor 33, and a curve of network output amplitude as a function of constant amplitude, variable frequency input will be obtained.

Having achieved linearity between sweep frequency and horizontal deflection over broad frequency ranges, numerous advantages and applications are at once evident. For example, as previously mentioned, using a comparatively wide sweep of frequencies, a number of consecutive television channels may be aligned on a multi-channel television tuner with but a single mean frequency setting. The high and low frequency cut-off points of each channel may be determined with considerable accuracy by the marker frequency generator.

In one embodiment of the present invention, the following components and tubes were used:

| | |
|---|---|
| Resistor **51** | 360K. |
| Resistor **52** | 680K. |
| Capacitor **53** | 0.01 microfarads. |
| Diode **54** | 6AL5. |
| Resistor **55** | 680K. |
| Capacitance **61** | 0.01 microfarads. |
| Variable resistor **62** | 2M. |
| Resistor **63** | 680K. |
| Capacitance **64** | 0.05 microfarads. |
| Tube **65** | ½ 6J6. |
| Variable resistor **66** | 1500 ohms. |
| Resistor **67** | 100K. |
| Resistor **71** | 100K. |
| Variable resistor **72** | 180K. |
| Capacitance **73** | 0.05 microfarads. |
| Variable resistor **74** | 2M. |
| Capacitor **75** | 0.005 microfarads. |

The nature of system application in other fields will, of course, be determined by the particular test network characteristics.

In view of the fact, therefore, that numerous modifications and departures may now be made by those skilled in this electrical art, the invention herein is to be construed as limited only by the spirit and scope of the appended claim.

What is claimed is:

Electrical apparatus for visually presenting the frequency response of a high frequency network upon an oscilloscope comprising an oscillator settable at a frequency in the range to be presented; means for coupling said oscillator with the input of the network, and the network output with the oscilloscope; electromechanical means for varying the oscillator frequency at a low frequency rate, responsive to a source of low frequency voltage; blanking means including circuit connections between said voltage source and said oscillator to effect oscillator cut-off and blanking of the oscilloscope presentation at alternate half cycles of said voltages; and circuit means for generating a deflecting signal to derive a response presentation substantially linear frequencywise including a sweep compensation circuit connected between said low frequency source and the deflection member of the oscilloscope, and elements shifting the phase of the deflecting signal by the order of 90° with respect to the phase of the source voltage whereby the rise of the deflecting signal is made coextensive with the full swing of said electromechanical means in one direction and the oscillator blanking is effective for the full reverse swing thereof.

References Cited in the file of this patent

UNITED STATES PATENTS

| | | |
|---|---|---|
| 2,266,541 | Foster et al. | Dec. 16, 1941 |
| 2,293,135 | Hallmark | Aug. 18, 1942 |
| 2,356,510 | Deserno | Aug. 22, 1944 |
| 2,473,426 | Halpern | June 14, 1949 |
| 2,490,045 | Gardner et al. | Dec. 6, 1949 |
| 2,570,139 | Maxwell | Oct. 2, 1951 |
| 2,649,570 | Radcliffe | Aug. 18, 1953 |